US010223326B2

(12) United States Patent
Frank et al.

(10) Patent No.: US 10,223,326 B2
(45) Date of Patent: Mar. 5, 2019

(54) DIRECT ACCESS PERSISTENT MEMORY SHARED STORAGE

(71) Applicant: Oracle International Corporation, Redwood Shore, CA (US)

(72) Inventors: Richard Frank, Naples, FL (US); Arun Kaimalettu, Kottayam (IN)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 13/956,096

(22) Filed: Jul. 31, 2013

(65) Prior Publication Data
US 2015/0039712 A1 Feb. 5, 2015

(51) Int. Cl.
*G06F 13/28* (2006.01)
*H04L 29/06* (2006.01)
*H04L 29/08* (2006.01)
*G06F 15/167* (2006.01)

(52) U.S. Cl.
CPC ............ *G06F 15/167* (2013.01); *G06F 13/28* (2013.01); *H04L 67/1097* (2013.01); *H04L 67/40* (2013.01)

(58) Field of Classification Search
USPC .................. 709/212, 213, 214, 215
See application file for complete search history.

(56) References Cited

U.S. PATENT DOCUMENTS

| | | | | |
|---|---|---|---|---|
| 5,987,506 A | * | 11/1999 | Carter .................. | G06F 9/5016 707/999.01 |
| 7,334,064 B2 | * | 2/2008 | Davies ................ | G06F 11/1456 710/62 |
| 7,415,723 B2 | * | 8/2008 | Pandya ............... | H04L 63/0218 370/389 |
| 7,725,559 B2 | * | 5/2010 | Landis .................. | G06F 9/5016 709/215 |
| 7,774,568 B2 | * | 8/2010 | Sudhakar ............ | G06F 11/1471 707/649 |

(Continued)

FOREIGN PATENT DOCUMENTS

| | | |
|---|---|---|
| WO | WO 2013/109640 A1 | 7/2013 |
| WO | WO2013/109640 A1 | 7/2013 |
| WO | WO 2015/094179 A1 | 6/2015 |

OTHER PUBLICATIONS

Hilland et al., "RDMA Protocol Verbs Specification" Version 1.0), dated Apr. 25, 2003, 243 pages.

(Continued)

*Primary Examiner* — Patrice L Winder
*Assistant Examiner* — Angela Widhalm de Rodriguez
(74) *Attorney, Agent, or Firm* — Hickman Palermo Becker Bingham LLP

(57) ABSTRACT

Techniques are described for providing one or more remote nodes with direct access to persistent random access memory (PRAM). In an embodiment, registration information is generated for a remote direct access enabled network interface controller (RNIC). The registration information associates an access key with a target region in PRAM. The access key is sent to a remote node of the one or more nodes. The RNIC may subsequently receive a remote direct memory access (RDMA) message from the remote node that includes the access key. In response to the RDMA message, the RNIC performs a direct memory access within the target region of PRAM.

21 Claims, 5 Drawing Sheets

(56) References Cited

U.S. PATENT DOCUMENTS

| | | | | |
|---|---|---|---|---|
| 7,885,953 | B2* | 2/2011 | Chen | G06F 17/30498 707/602 |
| 7,921,686 | B2* | 4/2011 | Bagepalli | H04L 63/166 370/352 |
| 8,266,472 | B2* | 9/2012 | Bose | G06F 11/2092 714/4.11 |
| 8,566,297 | B1* | 10/2013 | Dowers, II | G06F 17/30073 707/703 |
| 8,627,136 | B2* | 1/2014 | Shankar | G06F 11/2028 709/212 |
| 8,706,687 | B2* | 4/2014 | Fineberg | G06F 17/30368 707/609 |
| 8,977,801 | B2* | 3/2015 | Grube | G06F 9/4401 711/203 |
| 9,075,710 | B2* | 7/2015 | Talagala | G06F 12/0246 |
| 9,263,102 | B2* | 2/2016 | Flynn | G11C 7/1012 |
| 9,306,947 | B2* | 4/2016 | Kolbly | H04L 63/1408 |
| 2004/0225720 | A1* | 11/2004 | Pinkerton | 709/212 |
| 2005/0132017 | A1 | 6/2005 | Biran et al. | |
| 2005/0198062 | A1* | 9/2005 | Shapiro | G06F 17/30339 |
| 2006/0146814 | A1* | 7/2006 | Shah et al. | 370/389 |
| 2007/0078940 | A1* | 4/2007 | Fineberg et al. | 709/216 |
| 2008/0201234 | A1* | 8/2008 | Castro | G06F 17/30893 705/26.1 |
| 2009/0240664 | A1 | 9/2009 | Dinker et al. | |
| 2010/0095059 | A1* | 4/2010 | Kisley et al. | 711/114 |
| 2012/0166886 | A1 | 6/2012 | Shankar et al. | |
| 2013/0007180 | A1* | 1/2013 | Talpey et al. | 709/212 |
| 2013/0198312 | A1* | 8/2013 | Tamir et al. | 709/212 |
| 2013/0275391 | A1* | 10/2013 | Batwara | G06F 17/30085 707/689 |
| 2014/0325115 | A1* | 10/2014 | Ramsundar | G06F 12/0238 711/102 |
| 2015/0012735 | A1* | 1/2015 | Tamir et al. | 713/2 |

OTHER PUBLICATIONS

Culley P. et al., "An RDMA Protocol Specification" Internet Draft, dated Sep. 16, 2002, 58 pages.

* cited by examiner though the CPU's incur some overhead from memory registration and message processing, such latency is typically much lower than the latency of writing to disk and, therefore, does not significantly impact performance.
DIRECT ACCESS PERSISTENT MEMORY SHARED STORAGE

FIELD OF THE INVENTION

The present disclosure relates generally to techniques for accessing memory and, more specifically, to performing remote direct memory accesses to persistent memory on a storage server.

BACKGROUND

A storage server is a computer that provides remote clients with shared storage access, typically to disk storage. In order to manage input/output (I/O) operations from the remote clients, the storage server may use a message-based storage protocol. For example, when a remote client would like to read or write to shared disk, the remote client sends a message over a network to the storage server. An agent process running on the storage server responds to the request. The agent may process the message, perform the requested disk storage I/O operations, and return a confirmation message to the remote client. Thus, the storage protocol is two-sided as it involves central processing units (CPUs) on both sides of the connection executing processes that communicate with each other to coordinate I/O operations.

In some cases, two-sided storage protocols may use Remote Direct Memory Access (RDMA) to transfer data between the two computers. As the term is used herein, RDMA is a technology that allows the network interface controller (NIC) of the storage server to transfer data "directly" to or from memory of a remote client, that is, transferring the data to or from the memory without involving the central processing unit(s) (CPUs) on the remote client. In an example approach, the remote client registers a target memory buffer and sends a description of the registered memory buffer to the storage server. The remote client then issues a read or write request to the storage server. If the request is a write request, the storage server performs an RDMA read to load data from the target memory buffer into the storage server's local memory. The storage server then causes a disk controller to write the target data to disk and, once the write is complete, generates and sends a write confirmation message to the remote client. In response to a read request, the storage server uses the disk controller to perform a block-level read from disk and loads the data into its local memory. The storage server then performs an RDMA write to place the data directly into an application memory buffer of the remote computer. After an RDMA operation completes, the remote client deregisters the target memory buffer from the RDMA network to prevent further RDMA accesses. Using RDMA increases data throughput, decreases the latency of data transfers, and reduces the load on the storage server and remote client's CPU during data transfers. Al- The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Techniques are described herein for direct access to persistent memory in shared storage. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, a storage server comprises persistent random access memory (PRAM). PRAM may offer higher densities than dynamic random access memory (DRAM) and static random access memory (SRAM) options that are currently available on the market. In addition, PRAM is non-volatile, requiring no power to store data, whereas DRAM and SRAM require power to store data.

PRAM may be used as a direct replacement for DRAM as main memory in the storage server, which creates several advantages over other forms of non-volatile storage. For example, the latency of accessing PRAM may be significantly less than reading and writing to block devices. Accessing PRAM does not require a seek mechanism, messaging a storage controller, or block management such as block erasure and block buffering. Due to how fast reads and writes to PRAM may occur, even small processing overhead may significantly impact performance.

In an embodiment, a set of one or more clients use a one-sided storage protocol to access PRAM in the storage server. The one-sided storage protocol requires no CPU processing by the storage server during read and write operations. For example, a client may register the PRAM with a client's network adapter. The client may then use RDMA reads and writes to transfer data directly to and from the storage server's PRAM without any message processing by the storage server's CPU. Accordingly, the one-sided protocol may significantly reduce or eliminate CPU overhead during PRAM accesses. In addition, the scalability of I/O operations is not limited by any storage side agent processing.

In another embodiment, the PRAM on the storage server caches either part of or an entire database. Database servers on the remote clients may perform I/O operations to read and write data to persistent storage using the one-sided storage protocol. By using the one-sided protocol, a database management system (DBMS) may efficiently commit database transactions without writing data to block devices, such as disk.

System Overview

Figure 1:
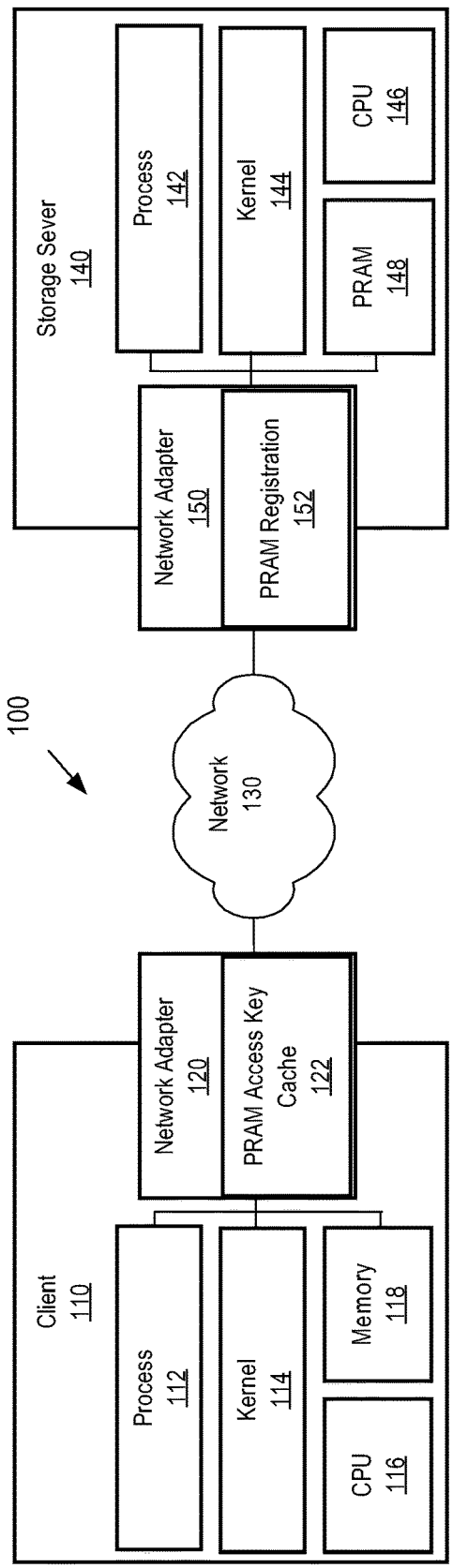
FIG. 1 is a block diagram depicting an example system for providing direct access to persistent storage, according to an embodiment.

FIG. 1 is a block diagram depicting an example system for providing direct access to persistent storage, according to an embodiment. System 100 generally comprises client system 110, network 130, and storage server 140. System 100 may comprise a plurality of other client systems communicatively coupled to storage server 140 via network 130 that are not illustrated for purposes of brevity.

Client system 110 generally comprises process 112, kernel 114, CPU 116, memory 118, and network adapter 120. Storage server 140 generally comprises process 142, kernel 144, PRAM 148, CPU 146, and network adapter 150. Each of client system 110 and storage server 140 may comprise other elements that are not illustrated for purposes of brevity. For example, client system 110 and/or storage server 140 may or may not comprise disk storage, depending on the particular implementation. In addition, each of these systems may comprise multiple CPUs.

Processes 112 and 142 may be any application processes that run on CPU 116 and CPU 146, respectively. For example, process 112 may be a server process of a DBMS. As another example, process 142 may be an instance of an application that performs registration of PRAM 148 as described in further detail below. The number and types of processes executed on each CPU may vary from implementation to implementation.

Kernels 114 and 144 are software processes that manage communications between the application processes and the hardware resources on client system 110 and storage server 140, respectively. For example, kernel 114 may determine which application process is allocated to CPU 116, which portions of memory 118 that the process is permitted to use, and how application processes communicate with network adapter 120. During RDMA operations, process 112 may bypass kernels 114 and 144 and directly access PRAM 148, as described in further detail below.

Client system 110 and storage server 140 are communicatively coupled via network 130. Network 130 may comprise one or more computer networks that provide communication channels that allow data communication between client system 110 and storage server 140. For example, network 130 may provide data communication services through the world wide packet data communication network now commonly referred to as the "Internet", a storage area network (SAN) and/or a local area network (LAN). In another example, network 130 may be a switched fabric communications link optimized for the RDMA protocol, such as an InfiniBand switch fabric or any other RDMA interconnect.

Network adapters 120 and 150 connect client system 110 and storage server 140, respectively, to network 130. Network adapters 120 and 150 may comprise any type of network adapter that supports RDMA operations, which are herein referred to as RDMA-enabled network interface controller (RNICs). Example RNICs include, without limitation, InfiniBand host channel adapters (HCAs). Network adapters 120 and 150 implement the RDMA protocol (RD-MAP) above a reliable transport. Thus, network adapters 120 and 150 may support protocols including, without limitation, RDMA over converged Ethernet (RoCE), the Internet Wide Area RDMA Protocol (iWarp), and the Infiniband protocol.

Network adapters 120 and 150 may be associated with an RNIC interface (RI), where the RI is the presentation of the RNIC to a consumer as implemented through the combination of the RNIC device and the RNIC device driver. A consumer, as used herein may be any software process, such as application processes and kernels, that communicate with the RNIC through the RI. The RI may be implemented as a combination of hardware, firmware, and software. A kernel may expose some or all of the RI functionality to application processes through one or more Application Programming Interfaces (APIs).

Processing performed by network adapters 120 and 150 may be performed by an RNIC engine. The RNIC engine offloads the processing of RDMA messages from CPUs 116 and 146 onto network adapters 120 and 150. The implementation of the RNIC engine may vary from implementation to implementation. For example, the RNIC engine may be included in an integrated circuit or some other hardware on a network adapter card. In another embodiment, the network adapters may include special purpose processors with limited instructions set for processing RDMA messages and performing direct memory accesses.

Persistent Random Access Memory

PRAM 148 is non-volatile RAM that may change or read individual stored bits without needing to erase or read an entire block of storage cells. Thus, in contrast to block devices, such as flash memory and hard disks, PRAM is not limited to moving data in the form of blocks. In addition, data in PRAM 148 may be overwritten without having to erase it first. Examples of PRAM 148 include, without limitation, phase-change memory and ferroelectric RAM.

PRAM 148 may be used as main memory for storage server 140 in addition to serving as a persistent data store for the remote clients. For example, PRAM 148 may be used as a direct replacement for or in addition to volatile memory, such as DRAM, and may be managed by kernel 144 in the same manner. Thus, PRAM 148 may be paged and/or segmented in the same manner as DRAM. In addition, PRAM 148 may be modularized in the same manner as DRAM, such as in dual in-line memory modules (DIMMs). Accordingly, PRAM 148 may comprise one or more modules, where each module has a plurality of electrical contacts that connect to a system bus within storage server 140, such as a Peripheral Component Interconnect (PCI) or PCI Express (PCIe) bus. In contrast to DRAM, PRAM 148 does not need to be refreshed and does not require power to maintain stored data.

PRAM 148 may be arranged in a grid pattern of rows and columns, where the intersection of a row and column is the address of a memory cell that stores a bit of data. Thus, each memory cell may be individually accessed by identifying its respective row address and column address. PRAM 148 may also be driven using a memory controller that uses a multiplexer circuit, such as used in a double data rate (DDR) or single data rate (SDR) memory controllers.

Shared Direct Access to Pram

In an embodiment, storage server 140 provides shared access to PRAM 148 for a plurality of remote clients. A "remote" client may be any client that is communicatively coupled to storage server 140 via network 130, such as client system 110. Storage server 140 may also be referred to herein as remote in relation to such client systems. Each of storage server 140 and the remote clients may also be referred to herein as "nodes." A node may refer to an electronic device that is attached to network 130 and is capable of sending, receiving, and/or forwarding information over network 130.

In an embodiment, only those remote clients that have been validated by storage server 140 are entitled to share PRAM 148. The techniques used to validate the remote clients may vary from implementation to implementation. For example, storage server 140 may require a remote client to authenticate using an identifier, password, and/or any other authentication factors. In another example, storage server 140 may restrict access to PRAM 148 to remote clients that are part of the same LAN or that are coupled via an Infiniband interconnect. In yet another example, a system administrator may explicitly identify remote clients for which access to PRAM 148 is enabled. Remote clients that are entitled to share PRAM 148 are herein referred to as "target" clients.

Once a remote client is validated, storage server 140 may allow the client to directly access PRAM 148. For example, storage server 140 may send each validated remote client (i.e., each target client) one or more access keys. The remote client may use the access keys to perform RDMA reads and writes to PRAM 148 according to a one-sided storage protocol. If a remote client has not successfully validated, storage server 140 may deny or otherwise restrict the remote client's access to the one or more access keys. This prevents unsecure accesses to PRAM 148 from unknown or untrusted remote clients.

Each target client may directly access and modify data items in one or more regions of PRAM 148, even if those data items were generated by a different remote client. For example, a first target client may generate a database table and store the table in PRAM 148. Other target clients may then read and/or modify individual rows of the table in PRAM 148. In another example, a first target client may generate and store a document, such as a media file, in PRAM 148. Other target clients may then read and/or modify the document in PRAM 148.

In some embodiments, certain regions may be restricted to different groups of target clients. For example, storage server 140 may restrict access to a first region of PRAM 148 to a first group of target clients and a second region of PRAM 148 to a second group of target clients. To restrict access, storage server 140 may expose access keys to the first region of PRAM 148 only to the first group of target clients and access keys for the second region only to the second group of target clients. This process may similarly be performed for other groups of target clients and respective regions of PRAM 148.

In an embodiment, storage server 140 may reserve one or more regions of PRAM 148 for local use. For example, storage server 140 may reserve a region for use by kernel 144 and another region for use by application processes. Thus, PRAM 148 may serve both as main memory for storage server 140 and as a persistent data store for the target clients. In another embodiment, storage server 140 may also comprise DRAM to use for main memory. PRAM 148 may thus be dedicated to providing target clients with persistent storage.

Storage server 140 may include other forms of non-volatile storage, such as disk or flash storage, or may rely solely on PRAM 148 to provide the target clients with non-volatile storage, depending on the particular implementation.

Registering Pram of a Storage Server with a Remote Client

Figure 2:
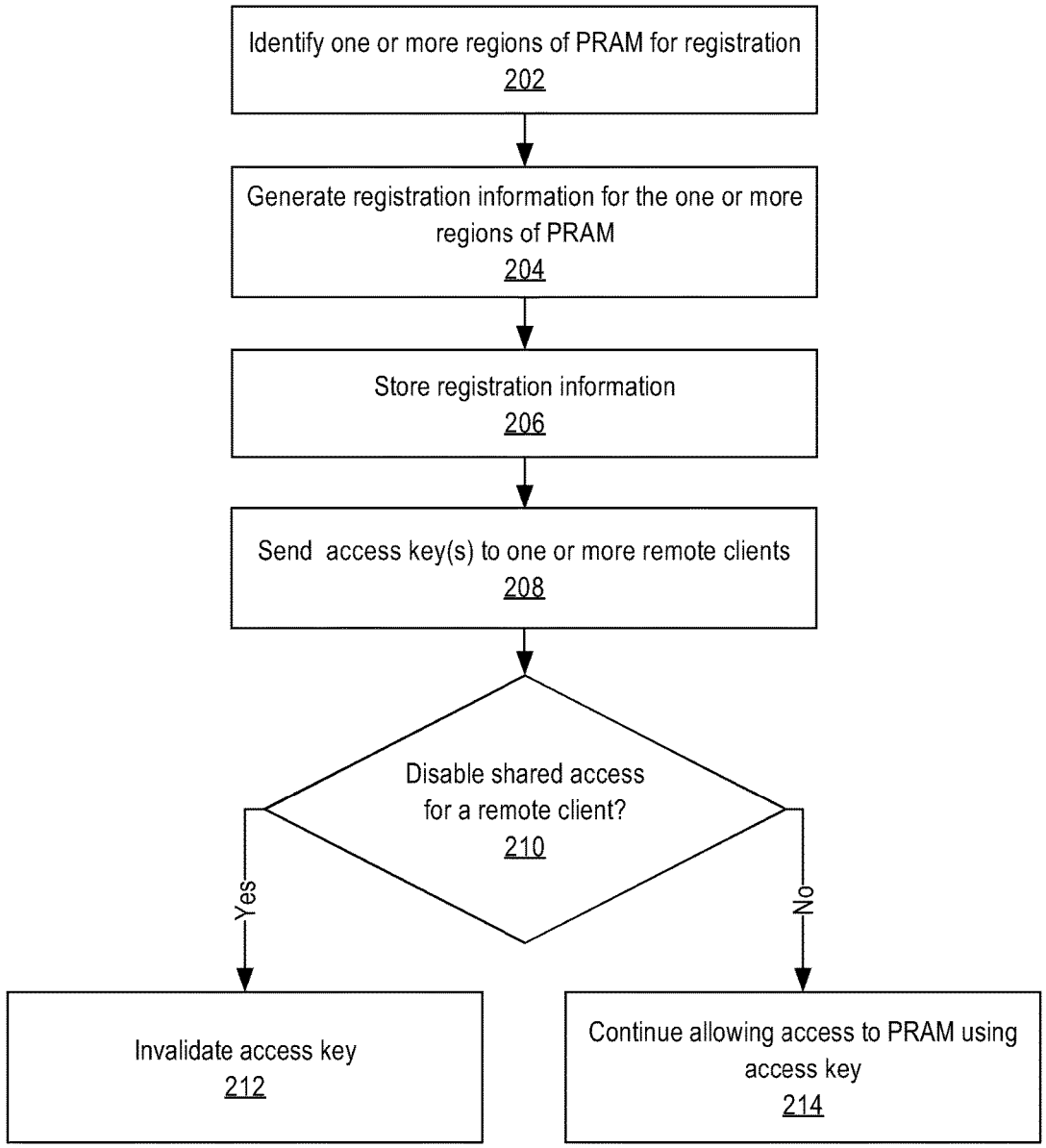
FIG. 2 is a flowchart depicting an example process for registering persistent memory, in accordance with an embodiment.

In order the enable the target clients to directly access PRAM 148, storage server 140 may register PRAM 148 with an RDMA network. FIG. 2 is a flowchart depicting an example process for registering persistent memory, in accordance with an embodiment. In step 202, process 142 sends a registration request to kernel 144. The registration request identifies one or more target regions of PRAM 148 for registration. For example, the request may specify a starting virtual or physical address and a length in bytes (i.e., the size of the region).

In step 204, PRAM registration information 152 is generated for the one or more regions of PRAM. PRAM registration information 152 generally describes the one or more target regions of PRAM to network adapter 150 in order to allow network adapter 150 to access the target regions without involving CPU 146 or kernel 144. For example, PRAM registration information 152 may comprise mapping information that provides network adapter 150 with a mapping between a set of one or more access keys and a physical memory address for a target region. For example, the mapping information may associate one or more access keys with an address list that specifies a list of addresses representing physical pages or blocks within a target memory region. In another embodiment, PRAM registration information 152 may comprise a virtual to physical memory address mapping for a target region of PRAM 148.

In step 206, the PRAM registration information 152 is stored in a location that is directly accessible by network adapter 150. Directly accessible in this context means that network adapter 150 may access the registration information 152 during RDMA operations without sending or receiving messages from CPU 146 or kernel 144. In an embodiment, PRAM registration information 152 is cached by network adapter 150. For example, PRAM 148 may store registration information comprising a translation table with mapping information that maps access keys to corresponding physical addresses. This cache may be directly accessed by network adapter 150, which may use the registration information to translate keys into physical addresses and perform direct memory accesses to PRAM 148.

In step 208, network adapter 150 sends the target clients one or more access keys for at least one target region of PRAM 148 that has been registered. Upon receipt, network adapter 120 may cache the access key in PRAM access key cache 122. The access keys that are sent at this step may vary from implementation to implementation. In an embodiment, a steering tag (STag) is sent to each target client. An STag comprises data that identifies a target region of PRAM. The STag may be used by an RNIC to indicate a remote client's authorization to access the target region and to identify a physical PRAM address for the target region. An example STag includes, without limitation, a remote key (R_key) as defined by the Infiniband protocol.

In some instances, storage server 140 may disable access to PRAM 148 for one or more target clients. For example, a system administrator may want to disable access to PRAM 148 if a target client is removed from an RDMA network or if they believe an access key has become comprised. In step 210, storage server 140 determines whether shared access for a target client should be disabled. This may be triggered in response to detecting removal of an target client from an RDMA interconnect or in response to any other triggering event, depending on the particular implementation. If storage server 140 determines that access should be disabled, then in step 212, the access key is invalidated. After the access key is invalidated, storage server 140 denies access to PRAM 148 for the invalidated access key. If the target client subsequently comes back online, storage server 140 generate and send an updated access key.

If there is no triggering event at step 210, then in step 214 the target clients may continue accessing PRAM using the previously generated access key. Thus, an access key sent at step 208 may be used indefinitely by the target clients to perform RDMA accesses to the target regions of PRAM 148.

For example, client system 110 may use the same access key in PRAM access key cache 122 to perform multiple RDMA reads and writes to PRAM 148. The same access key may also be used to access different memory locations within PRAM 148. The target client may use an access key for as long as the target client is entitled to access shared storage within storage server 140, and storage server 140 does not have to perform registration of PRAM 148 for each RDMA operation.

One-Sided Storage Protocol for Transferring Data to Persistent Storage

In an embodiment, the target remote clients implement a one-sided storage protocol to store data persistently in PRAM 148. The storage protocol is one-sided as it does not require any message processing or data copying by CPU 146 on storage server 140. Thus, CPU resources may be used to perform other tasks while I/O operations are being performed, and latency caused by such message processing and data copying may be eliminated.

Figure 3:
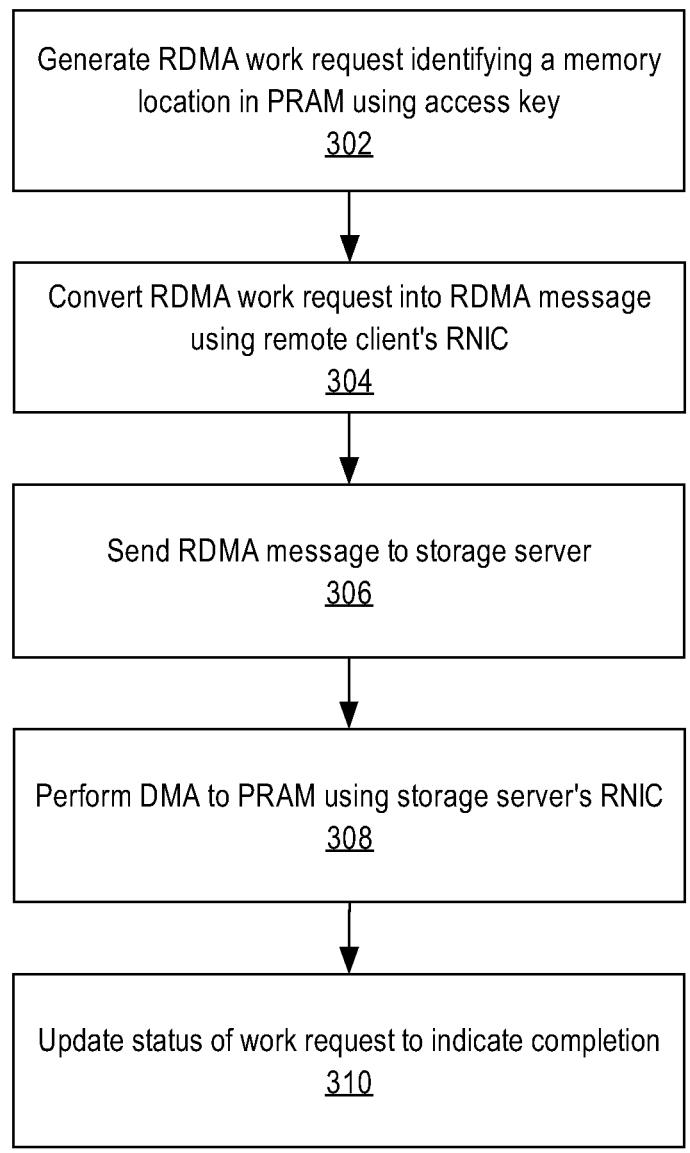
FIG. 3 is a flowchart depicting an example process for implementing a one-sided storage protocol, according to an embodiment.

FIG. 3 is a flowchart depicting an example process for implementing a one-sided storage protocol, according to an embodiment. In step 302, a consumer, such as process 112 or kernel 114, generates an RDMA work request to access a registered region of PRAM 148 (i.e., a "target" region). In an embodiment, the work request identifies the target region using an access key previously provided by storage server 140. The work request may also identify a target memory location (or sub region) within the target region by specifying an offset and/or a length. The RDMA work request may correspond to a request to perform an RDMA read or write operation to the target memory location in PRAM 148. The RI may convert the work request to a work queue element (WQE) and place the WQE in a work queue that is associated with network adapter 120, such as a send queue. A WQE is a network adapter's internal representation of a work request and may be directly processed by the RI without communicating with software processes executing on CPU 116.

In step 304, network adapter 120 processes the work request to generate an RDMA message identifying the target. Network adapter 120 may generate an RDMA read message or an RDMA write message, depending on the work request. An RDMA write message uses at least one access key previously provided by storage server 140 to identify a memory location in PRAM 148 to persistently store a data item. For example, the RDMA write message may identify the memory location using an STag, an offset, and a size. The RDMA write message further includes a data payload to write to the identified memory location. An RDMA read message may similarly identify a memory location to read a data object from persistent storage. The read message may further include an STag or other identifier of a local buffer in memory 118 to indicate where the read data payload should be placed.

In step 306, network adapter 120 sends the RDMA message over network 130 to network adapter 150. Network adapter 150 may place the RDMA message in a work queue, such as a receive queue, for subsequent processing by network adapter 150.

In step 308, network adapter 150 processes the received RDMA message and performs a direct memory access to the targeted memory location in PRAM 148. In response to an RDMA write message, network adapter 150 writes the data payload to the target memory location using a direct memory access write and returns a hardware acknowledgement (i.e., an acknowledgment generated by the RNIC hardware) to network adapter 120. For an RDMA read, network adapter 150 performs a direct memory access read of data from the target memory location and returns an RDMA read response message to network adapter 120. Network adapter 150 may identify the target memory location where a data item is or should be persistently stored by using PRAM registration information 152 to map the STag and offset, included in the RDMA message, to a physical address in PRAM 148. For example, the STag may map to a particular base physical memory address for a region in PRAM. The offset may identify the starting location to read or write to within the target region, and a length may indicate the size of data (e.g., in bytes, octets, etc.) that is read or written.

In the case of an RDMA read, network adapter 120 receives an RDMA read response message including a data payload read from the target region of PRAM 148. To process the RDMA read response message, network adapter 120 may perform a direct memory access write to place the data payload included in the message into a target buffer in memory 118. The RDMA read response message may reference the target buffer using an STag previously provided by the target client in the RDMA read message. In an embodiment, the target buffer is a temporary storage location for a data object that is being read from PRAM 148. For example, the target buffer may be part of application memory for process 112. Thus, unlike an STag used to perform reads and/or writes to PRAM 148, the STag used to processes an RDMA read response message identifies a temporary storage location for the data payload included in the RDMA read response message.

The direct memory access operation in step 308 may be performed without requiring any processing by CPU 146 or any other CPU on storage server 140. Instead, network adapter 150 handles the direct memory access, which is triggered by the RDMA message it receives from the network adapter of a target client. Thus, CPU 146 may perform other operations during RDMA reads and writes and does not need to process any messages from the target clients. In addition network adapter 150 may place data items into PRAM 148 without CPU 146 or any other CPU on storage server 140 performing data copy operations.

In step 310, network adapter 120 updates a status associated with the RDMA work request upon completion of the RDMA work request. For example, network adapter 120 may update the status after receiving a hardware acknowledgment or processing an RDMA read response message from RNIC 150. In an embodiment, network adapter 120 updates the status of the RDMA work request by placing a completion queue entry (CQE) into a completion queue. The CQE is an RI internal representation of a respective work request in the WQ that has completed. A consumer is able to find out if a work request has completed by polling or notification, depending on the particular implementation.

Ensuring Data Persistence During a One-Sided RDMA Write Operation

Power failures and system crashes may prevent data from being written to PRAM in some instances. For example, if network adapter 120 sends an RDMA write message to network adapter 150, network adapter 150 may buffer the write message and send a hardware acknowledgment once the last byte of the message is received. However, part of the data payload may still reside in the buffer of network adapter 150 when the hardware acknowledgment is sent. If the power fails or the system crashes before all or part of the data payload is placed on the peripheral bus connecting PRAM 148 and network adapter 150, then this data may not be written to PRAM 148.

In an embodiment, a target client's network adapter generates an RDMA read message after each RDMA write to ensure that the data has been persistently stored. The RDMA read message may be directed to a final portion of data included in the RDMA write data payload. Due to the ordering functions implemented by the RDMA protocol, the final portion of data is placed in memory only after all pervious portions of the data payload have been written to PRAM. Reading only a final portion of the data payload minimizes the size of the RDMA response message and reduces the protocol latency.

Figure 4:
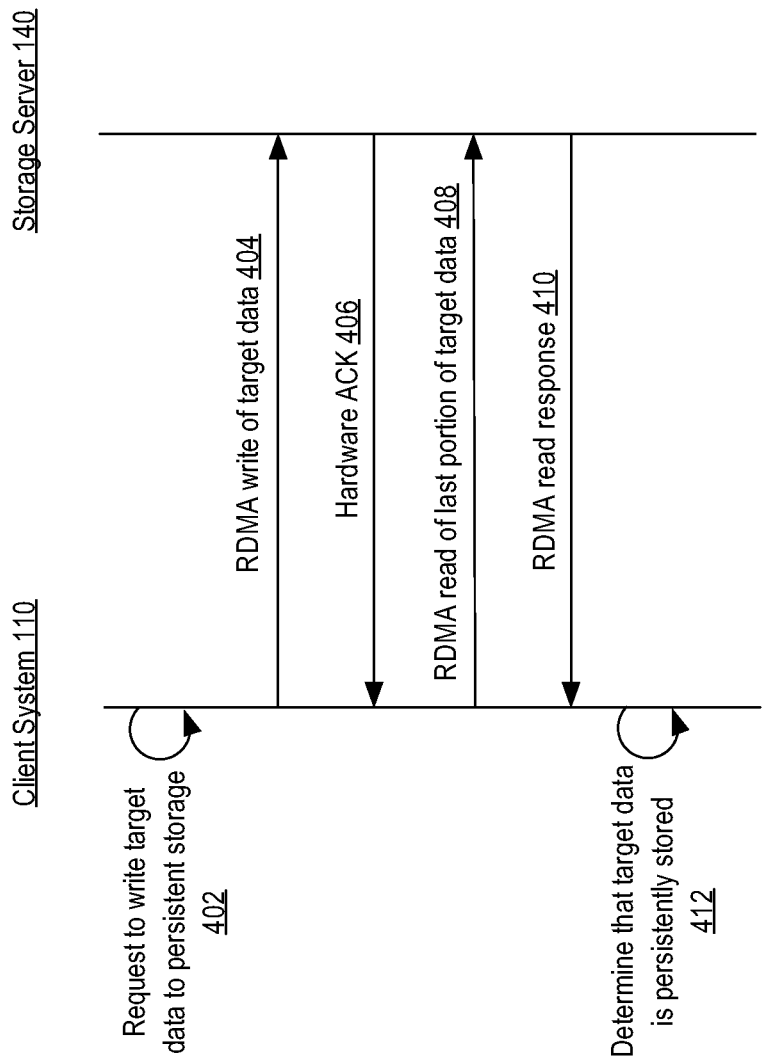
FIG. 4 is a ladder diagram illustrating an example process for writing data to persistent memory, according to an embodiment.

FIG. 4 is a ladder diagram illustrating an example process for writing data to persistent memory, according to an embodiment. In step 402, client system 110 generates a request to write target data to persistent storage. In step 404, client system 110 sends an RDMA write message including the target data. In step 406, storage server returns a hardware acknowledgment when the entire write message has been received by network adapter. In step 408, client system 110 issues an RDMA read message identifying the last portion of the target data. In an embodiment, the last portion is the last byte of data that is written. However, any other portion may be specified, depending on the particular implementation. In step 410, storage server 140 sends an RDMA read response including the last portion of the target data. In response to determining that the RDMA read was successful, client system 110 may determine that the target data is persistently stored at step 412.

The RDMA read response may be processed according to the techniques described above. For example, the last byte of data may be placed into a temporary buffer in application memory. Once the RDMA read response is successfully processed, an application, such as a database server, may determine that the data was successfully written to persistent storage. The application may then discard the last portion of data from the temporary buffer.

In some instances, the RDMA read response may be returned before the target data is physically written to PRAM 148. In an example embodiment, the RDMA read response may be returned after the last portion of the target data is placed on a peripheral bus, such as a PCIe bus, that connects network adapter 150 with PRAM 148. In an embodiment, once the data is on the peripheral bus, network adapter 150 may assume that the data is persistently stored by PRAM 148. Storage system 140 may ensure that once the data is placed on such a peripheral bus, that there will be enough power to flush any intermediary buffers between network adapter 150 and PRAM 148 such that the data is written to the appropriate PRAM location. Thus, storage system 140 may guarantee that the data will reach PRAM 148 once network adapter 150 places the data on the peripheral bus.

The one-sided protocol may thus be used by target clients to determine that the storage server has persistently stored a data object in PRAM 148. The data objects that are persistently stored may vary from implementation to implementation. For example, a database may be either entirely or partially stored in PRAM 148. As another example, a file system may be either entirely or partially stored in PRAM 148. Thus, a data object may be any resource for storing data, and example data objects may include, without limitation, computer files, such as documents, images, and other media files; database objects, such as tables, partitions, and views; and metadata, such as file and database object definitions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
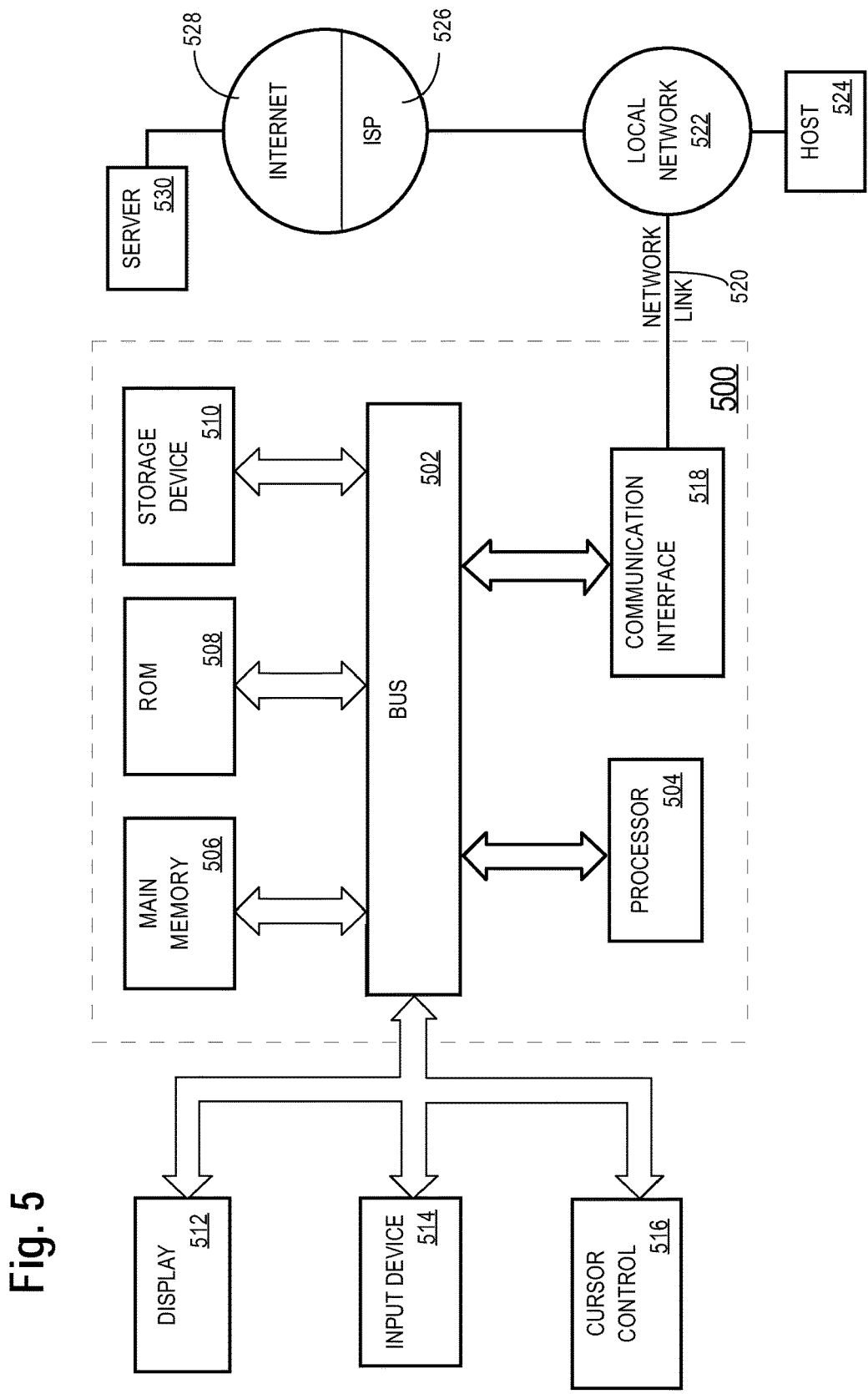
FIG. 5 is a block diagram depicting a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an RNIC. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for providing one or more database servers with direct access to at least part of a database stored persistently in a storage server, the method comprising:
   generating, for a remote direct access memory enabled network interface controller (RNIC) of said storage server, registration information that associates an access key with a target region in persistent random access memory (PRAM) of said storage server;
   storing the registration information in a cache that is associated with the RNIC;
   sending the access key to a database server of the one or more database servers;
   receiving, by the RNIC, a remote direct memory access (RDMA) message from the database server that includes the access key;
   wherein the RDMA message identifies, based at least on the access key, a memory location within the target region where a data object within the database is persistently stored;
   determining, by the RNIC using the registration information and based at least in part on the access key, an address within the target region in PRAM;
   performing, by the RNIC, a direct memory access at the address within the target region of PRAM without communicating with a storage controller for the storage server while performing said direct memory access.

2. The method of claim 1, wherein the RDMA message includes a data payload and identifies, based on the access key, a memory location within the target region in PRAM for persistently storing the data payload.

3. The method of claim 2, the method further comprising:
   receiving, from the database server by the RNIC, an RDMA read message that identifies a final portion of the data payload;
   returning, to the database server by the RNIC, an RDMA read response message that includes the final portion of the data payload;
   wherein the RDMA read response message confirms that the data payload has been persistently stored.

4. The method of claim 1, the method further comprising returning, by the RNIC, the data object to the database server in an RDMA read response message;

wherein the RDMA read response message references a buffer in the database server where the data object should be placed.

5. The method of claim 1,
wherein the RDMA message is a first RDMA message that identifies, based on the access key, a first memory location within the target region of PRAM;
wherein the direct memory access is to the first memory location within the target region of PRAM;
the method further comprising:
receiving, by the RNIC, a second RDMA message from the database server that includes the access key and identifies a second memory location within the target region of PRAM;
performing, by the RNIC, a second direct memory access to the second memory location within the target region of PRAM.

6. The method of claim 1,
wherein the direct memory access is a first direct memory access,
wherein the registration information associates a second access key with the target region in PRAM,
the method further comprising:
sending the second access key to a second database server of the one or more database servers;
receiving, at the RNIC, a second RDMA message from the second database server that includes the second access key;
in response to receiving, at the RNIC, the second RDMA message from the second database server that includes the second access key, performing, by the RNIC, a second direct memory access within the target region of PRAM.

7. The method of claim 6, wherein the second direct memory access is to said memory location in the target region of PRAM accessed by the first direct memory access.

8. One or more non-transitory computer-readable media storing sequences of instructions that, in response to being executed by one or more processors, cause:
generating, for a remote direct access memory enabled network interface controller (RNIC) of a storage server, registration information that associates an access key with a target region in persistent random access memory (PRAM) of the storage server;
wherein the PRAM stores at least part of a database;
storing the registration information in a cache that is associated with the RNIC;
sending the access key to a database server of one or more database servers;
receiving, at the RNIC, a remote direct memory access (RDMA) message from the database server that includes the access key;
wherein the RDMA message identifies, based at least on the access key, a memory location within the target region where a data object within the database is persistently stored;
determining, by the RNIC using the registration information and based at least in part on the access key, an address within the target region in PRAM;
performing, by the RNIC for the database server, a direct memory access at the address within the target region of PRAM without communicating with a storage controller for the storage server while performing said direct memory access.

9. The non-transitory computer-readable media of claim 8, wherein the RDMA message includes a data payload and identifies, based on the access key, a memory location within the target region in PRAM for persistently storing the data payload.

10. The non-transitory computer-readable media of claim 9, said sequences of instructions including instructions that, in response to being executed by one or more processors, cause:
receiving, from the database server at the RNIC, an RDMA read message that identifies a final portion of the data payload;
returning, to the database server by the RNIC, an RDMA read response message that includes the final portion of the data payload;
wherein the RDMA read response message confirms that the data payload has been persistently stored.

11. The non-transitory computer-readable media of claim 8, said sequences of instructions including instructions that, in response to being executed by one or more processors, cause:
returning, by the RNIC, the data object to the database server in an RDMA read response message;
wherein the RDMA read response message references a buffer in the database server where the data object should be placed.

12. The non-transitory computer-readable media of claim 8,
wherein the RDMA message is a first RDMA message that identifies, based on the access key, a first memory location within the target region of PRAM;
wherein the direct memory access is to the first memory location within the target region of PRAM;
wherein said sequences of instructions include instructions that, in response to being executed by one or more processors, cause:
receiving, by the RNIC, a second RDMA message from the database server that includes the access key and identifies a second memory location within the target region of PRAM;
performing, by the RNIC, a second direct memory access to the second memory location within the target region of PRAM.

13. The non-transitory computer-readable media of claim 8,
wherein direct memory access is a first direct memory access,
wherein the registration information associates a second access key with the target region in PRAM,
wherein said sequences of instructions include instructions that, in response to being executed by one or more processors, cause:
sending the second access key to a second database server of the one or more database servers;
receiving, at the RNIC, a second RDMA message from the second database server that includes the second access key;
in response to receiving, at the RNIC, the second RDMA message from the second database server that includes the second access key, performing, by the RNIC, a second direct memory access within the target region of PRAM.

14. The non-transitory computer-readable media of claim 13, wherein the second direct memory access is to the memory location in the target region of PRAM accessed by the first direct memory access.

15. A storage server for providing one or more database servers with direct access to at least part of a database stored persistently by the storage server, the storage server comprising:
- one or more central processing units (CPUs);
- persistent random access memory (PRAM) of a storage server;
- wherein the PRAM stores at least part of a database;
- a remote direct access memory enabled network interface controller (RNIC) configured to:
  - store registration information that associates an access key with a target region in PRAM;
  - send the access key to a database server of the one or more database servers;
  - receive a remote direct memory access (RDMA) message from the database server that includes the access key;
  - wherein the RDMA message identifies, based at least on the access key, a memory location within the target region where a data object within the database is persistently stored;
  - determine, using the registration information and based at least in part on the access key, an address the target region in PRAM;
  - perform, for the database server, a direct memory access at the address within the target region in PRAM without communicating with a storage controller for the storage server while performing said direct memory access.
- a bus interconnecting the one or more CPUs, the PRAM, and the RNIC.

16. The storage server of claim 15, wherein RNIC receives the RDMA message and performs the direct memory access without interacting with the one or more CPUs.

17. The storage server of claim 15, wherein the RDMA message includes a data payload and identifies, based on the access key, a memory location within the target region in PRAM for persistently storing the data payload.

18. The storage server of claim 15, wherein the registration information associates a second access key with the target region in PRAM, the RNIC is further configured to:
- send the second access key to a second database server of the one or more database servers;
- receive a second RDMA message from the second database server that includes the second access key;
- in response to receiving the second RDMA message from the second database server that includes the second access key, performing a second direct memory access within the target region of PRAM.

19. The method of claim 1, wherein determining, by the RNIC using the registration information and based at least in part on the access key, an address within the target region in PRAM includes determining, by the RNIC using the registration information and based at least in part on the access key and the memory location, an address within the target region in PRAM.

20. The one or more non-transitory computer-readable media storing instructions of claim 8, wherein determining, by the RNIC using the registration information and based at least in part on the access key, an address within the target region in PRAM includes determining, by the RNIC using the registration information and based at least in part on the access key and the memory location, an address within the target region in PRAM.

21. The storage server of claim 15, wherein the RNIC is configured to determine, using the registration information and based at least in part on the access key, an address the target region in PRAM by being configured to determine, by the RNIC using the registration information and based at least in part on the access key and the memory location, an address within the target region in PRAM.

* * * * *

UNITED STATES PATENT AND TRADEMARK OFFICE
CERTIFICATE OF CORRECTION

PATENT NO. : 10,223,326 B2
APPLICATION NO. : 13/956096
DATED : March 5, 2019
INVENTOR(S) : Frank et al.

Page 1 of 1

It is certified that error appears in the above-identified patent and that said Letters Patent is hereby corrected as shown below:

In the Claims

In Column 15, Line 23, in Claim 15, delete "address" and insert -- address within --, therefor.

In Column 15, Lines 29-30, in Claim 15, delete "access. a" and insert -- access a --, therefor.

In Column 16, Line 31, in Claim 21, delete "address" and insert -- address within --, therefor.

Signed and Sealed this
Seventeenth Day of March, 2020

Andrei Iancu
*Director of the United States Patent and Trademark Office*